Aug. 9, 1960 A. W. GOULD 2,948,507
LUMBER COMPRESSING AND ALIGNING TOOL
Filed Aug. 27, 1958 3 Sheets-Sheet 1
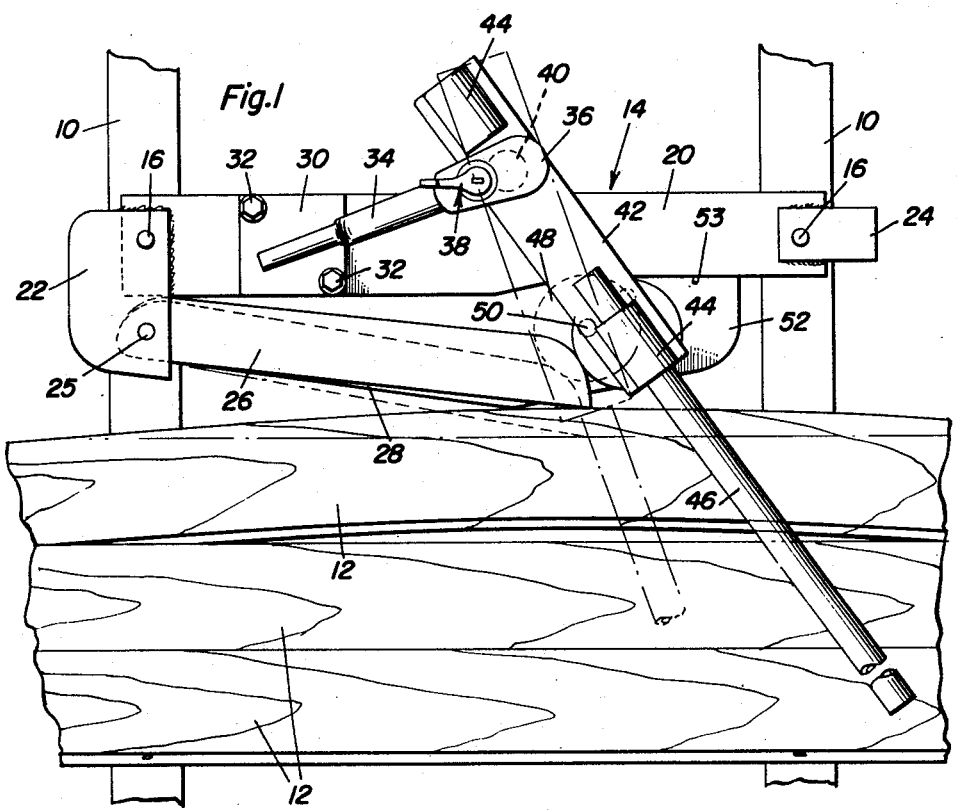
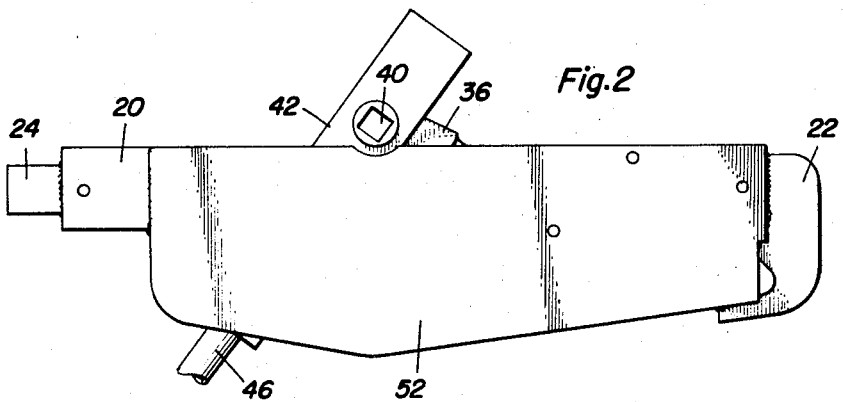
Albert W. Gould
INVENTOR.

Aug. 9, 1960   A. W. GOULD   2,948,507
LUMBER COMPRESSING AND ALIGNING TOOL
Filed Aug. 27, 1958   3 Sheets-Sheet 2
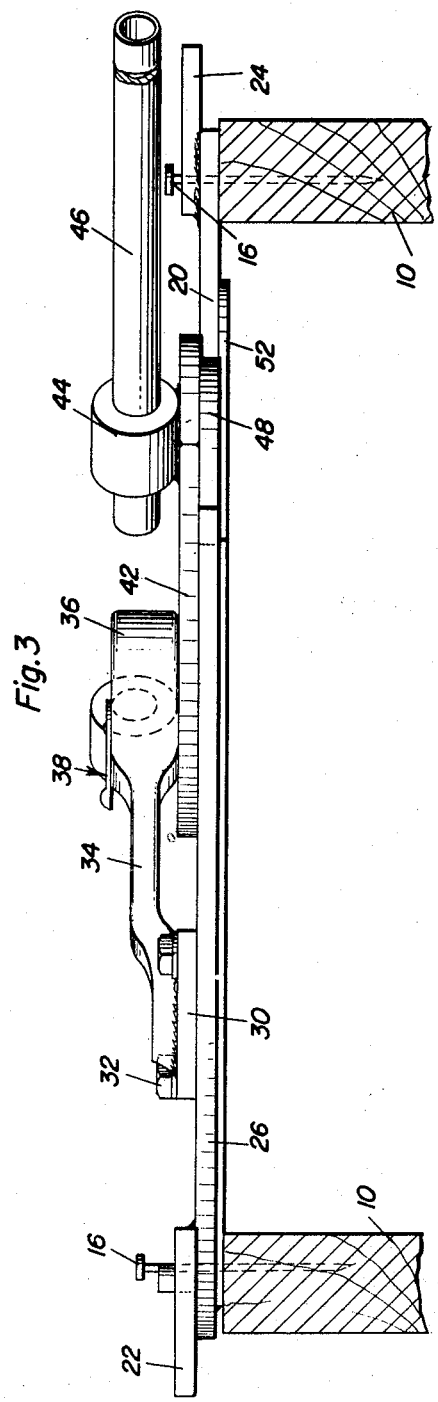
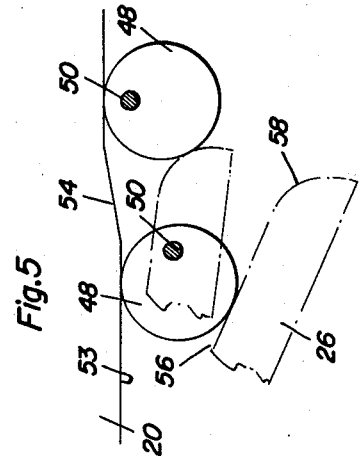
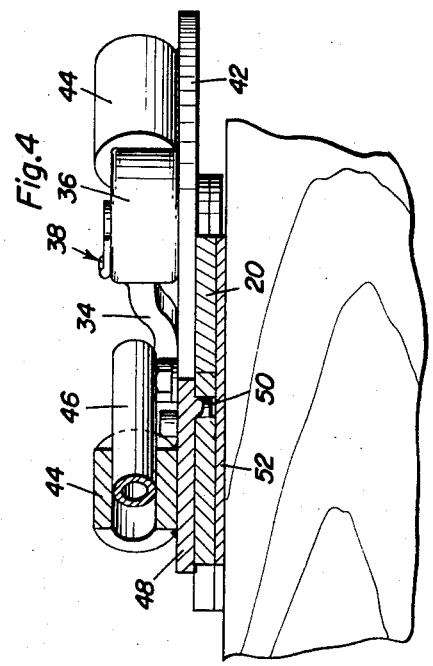
Albert W. Gould
INVENTOR.
BY *Clarence A. O'Brien*
*and Harvey B. Jacobson*
Attorneys Aug. 9, 1960 A. W. GOULD 2,948,507
LUMBER COMPRESSING AND ALIGNING TOOL
Filed Aug. 27, 1958 3 Sheets-Sheet 3

Albert W. Gould
INVENTOR.

BY *Clarence A. O'Brien*
*and Harvey B. Jacobson*
Attorneys

United States Patent Office 2,948,507
Patented Aug. 9, 1960

2,948,507

LUMBER COMPRESSING AND ALIGNING TOOL

Albert W. Gould, 16 W. Kaley Ave., Orlando, Fla.

Filed Aug. 27, 1958, Ser. No. 757,589

10 Claims. (Cl. 254—15)

This invention comprises a novel and useful lumber compressing and aligning tool and more specifically relates to an apparatus specifically designed to facilitate the aligning of boards in close side-by-side relation for the laying of floors and the like, and especially for the compressing of tongue and groove boards into a closely fitting side-by-side relation.

The primary purpose of this invention is to provide a tool which will facilitate the laying of flooring and the like in a close fitting side-by-side relation.

A further object of the invention is to provide a tool specifically adapted for the compressing of tongue and groove boards into an interlocked close fitting relation such as for use in flooring, wall siding and the like.

Yet another object of the invention is to provide an apparatus in accordance with the preceding objects which will enable crooked boards to be successfully employed in such constructions by effecting a straightening of the boards in their assembly relation in preparation for nailing or otherwise securing the boards fixedly in the desired relation.

A still further important object of the invention is to provide a tool in accordance with the foregoing object which will be easy to use, and attain a good mechanical advantage in the compressing of boards.

Yet another purpose is to provide a tool of the floor jack type capable of operating at a mechanical advantage and in confined quarters for pressing a crooked floor board into a straight, tight fitting engagement with the flooring previously laid, and which will retain the board in its straightened and compressed condition without requiring the continual attention or strength of the worker.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view showing a preferred embodiment of the tool forming the subject of this invention and illustrating the operation of the same in laying flooring and the like;

Figure 2 is a bottom plan view of the tool itself;

Figure 3 is a view in side elevation of the tool and showing the manner of applying the same to a frame construction in preparation for compressing and aligning boards;

Figure 4 is a vertical sectional view through a portion of the tool of Figure 1;

Figure 5 is a somewhat diagrammatic view in plan illustrating the operation of the tool;

In the assembling of boards in side-by-side relation to form flat surfaces, such as the laying of floors or subflooring, sidings or subsidings and the like, it is frequently necessary to exert considerable force in order to compress the boards into a close side-by-side relation with each other throughout their length and thus form a tight partition or flooring. This problem is particularly acute when it is desired for economical reasons to employ boards which are crooked or are not straight throughout their length and which it is desired to force into a close fitting side-by-side relation with the adjacent board.

The tool in accordance with the present invention provides a means which would be easily applied, especially in confined quarters such as when working in corners or the like, and will exert a considerable mechanical advantage or leverage in order to effect the desired compressive action upon the boards to be placed and compacted into place.

Figure 6:
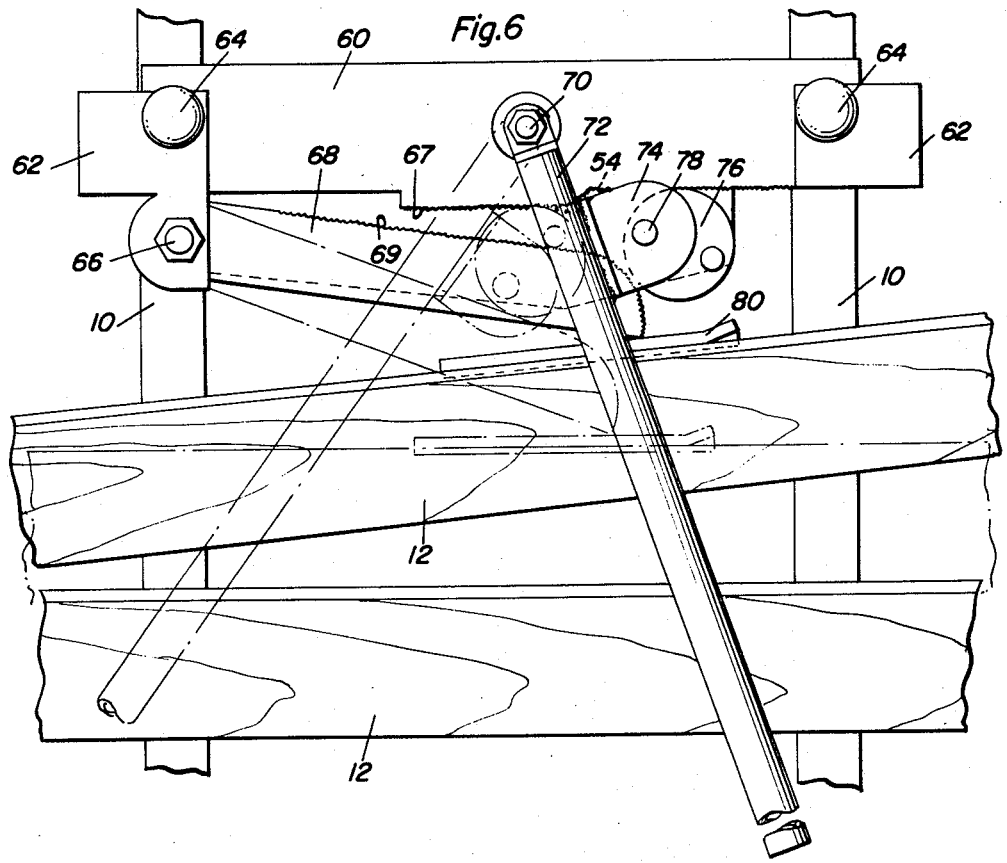
Figure 6 is a view similar to Figure 1 but showing a modified construction of the tool in operation.
Figure 7:
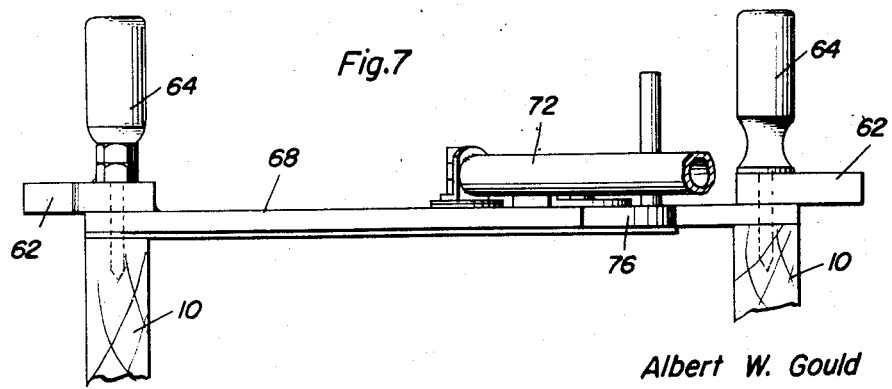
Figure 7 is a detail view of a portion of the tool of Figure 6.

In order to illustrate the principles of this invention there are disclosed two embodiments of tool, that of Figures 1–5 employing a ratchet construction which will enable an applied pressure to be maintained indefinitely thus freeing the operator for other activity; and a non-ratchet form shown in Figures 6 and 7 which is of a less complex and expensive construction.

Referring first to the embodiment of Figures 1–5, it will be seen that there is shown in Figure 1 a pair of rafters or studs 10 to which is to be secured a flooring or partition consisting of a series of boards as at 12. In order to effect a satisfactory partition or flooring, it is desired that the edges of the boards be forced into a tight side-by-side relation without cracks therebetween, and to be enabled to form such a flooring or siding even though the boards may be crooked or warped as shown in Figure 1.

In accordance with this invention, the apparatus designated generally by the numeral 14 is detachably secured to the studs or rafters 10 as by removable dowel pegs or pins 16, see also Figure 3. The tool is disposed closely adjacent the last board laid which is to be forced into a tight side-by-side engagement with the previously applied, compressed and nailed or otherwise secured boards.

The tool includes a flat elongated metallic plate or strip 20 constituting a base plate and which has welded or otherwise rigidly secured to the opposite ends thereof a pair of projecting ears or lugs 22 and 24. The anchoring pins 16 extend through aligned apertures in the ears and ends of the base plate 20 and of the lugs 22 and 24 as will be apparent from Figures 1 and 3.

Secured to the underside of one of the ears such as the ear 22 as by a pivot pin 25 there is a lever or arm 26 which is thus movable towards and from the edge of the base plate 20 and lies in the same plane with the latter. The outer edge of this arm indicated by the numeral 28 is straight and constitutes a pressure surface adapted to engage the edge of the board 12 which is to be forced into close juxtaposition to the adjacent boards already laid.

Removably and rigidly secured to the top of the base plate 20 adjacent the lug 22 is a bracket 30, provided with mounting bolts 32. Welded to the top surface of the bracket is a support arm 34. The end of this support arm is provided with an enlarged head or housing 36 in which is received any conventional form of a ratchet mechanism indicated generally by the numeral 38 such as that disclosed in the patent to R. G. Knudsen, 2,544,795, filed July 13, 1945 and which controls the direction of rotation of a pivot pin 40 which is fixedly secured to a lever arm 42. The arrangement is such that the lever arm 42 may be oscillated in either direction about its pivotal connection with the support arm 34 depending upon the adjustment of the ratchet mechanism 38.

At its opposite ends, the lever arm 42 is provided with sockets or sleeves 44 rigidly secured thereto into which may be selectively inserted a rod 46 comprising a handle for the lever.

Journaled upon the underside of the lever arm 42 is a wedge in the form of an eccentric wheel or roller 48, see also Figure 5, which is mounted upon the pivot pin 50. This eccentric wheel lies between and in the same plane as that of the base 20 and the pressure arm or lever 26.

Conveniently, a plate 52 may be secured to the underside of the base plate to support the eccentric wheel and to guide it in its engagement with the base plate and with the pressure arm as set forth hereinafter.

Referring now particularly to the diagrammatic view of Figure 5 it will be seen that the edge 53 of the base plate 20 has at an appropriate place thereon a relatively inclined camming surface 54. The adjacent edge 56 of the pressure lever 26 adjacent its end which is remote from the pivot 25 is provided likewise with a curved or cam surface 58. The arrangement is such that as the lever arm 42 is oscillated about its ratchet pivot, the eccentric wheel 48 is caused to travel along the edge of the base plate, and likewise against the adjacent edge 56 of the pressure arm 26. As the wheel encounters the cam surfaces 54 and 58, it initiates an accelerated movement of the lever 26. During the travel of the eccentric wheel, the lever arm 26 is caused to oscillate about its pivot 25, thereby compelling the pressure edge 28 thereof to press against the adjacent board 12 and thus force the same against the previously laid and secured floor boards. The ratchet mechanism provides a means which will enable the pressure once applied to this plate to be retained, thus holding the board in compressed position and permitting the operator to nail or secure the board to the members 10 at his leisure.

It will be observed that this apparatus is very compact, as well as flat in construction, and thus may be used in places where there is very little head room or clearance, as below low roofs of attics, in corners and the like.

Figures 6 and 7 disclose a somewhat simpler modification of the apparatus in which the ratchet mechanism has been omitted. In this figure like numerals have been given to similar parts. In this form of the apparatus there is likewise provided a base plate as at 60, having ears or lugs 62 secured to and projecting beyond the opposite ends of the same. Also dowels or the like 64 are provided whereby the ears and the base are secured in adjusted position upon the members 10 in juxtaposition to the boards 12 to be laid and compressed thereon. Upon one of the ears 62 there is pivoted as at 66 one extremity of a pressure arm 68. By means of a fulcrum or pivot pin 70 one extremity of a handle 72 is secured to the base plate 60, this handle having a lug 74 secured to and projecting laterally from one side thereof. An eccentric wheel 76 is pivoted to this lug as at 78, and co-operates with the adjacent edge of the base plate 60 and the adjacent pressure edge of the pressure lever or arm 68. Thus, as in the preceding embodiment, movement of the lever 72 results in a swinging movement of the pressure arm 68 causing the latter to abut against and press against the edge of a board 12 and force the same into the desired position. A pressure block 80 of any desired character may be applied to the edge of the board to take the thrust of the outer edge of the pressure lever 68.

In this embodiment, the adjacent edges of the base plate 60 and the pressure lever 68 are knurled at 67 and 69 respectively and are of relatively harder material than the surface of the wheel 76. Consequently, during operation the knurled edges will grip or bite into the softer surface of the wheel, thereby locking the latter, and the pressure lever in an adjusted, pressure applying position. When accumulated wear of the knurled surfaces on the wheel 76 render the latter unfit for further operation, the wheel may be readily replaced.

The knurled edges and the relatively softer wheel thus serve the same functions as the ratchet mechanism in the preceding embodiment.

In this form of the invention, a mechanical advantage is thus attained for forcing a board into position. This form of the apparatus although lacking the ratchet means for retaining a pressure once applied as in the preceding embodiment, does enable the user to operate in cramped quarters, and attain a mechanical advantage for forcing a board into compacted position with the boards previously laid.

In both forms of the invention the parallel, laterally spaced opposite end portions of the edges 53 and 67 are connected by the cam surface 54. This greatly increases the amplitude of travel of the pressure arms 26 and 68 under the travel of the pressure wheels 48 and 76.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A floor tightening clamp comprising a flat metal strap comprising a base, means detachably securing said base to a floor structure for compressing lumber in side-by-side abutting engagement thereon, a pressure arm pivotally connected to said base for swinging movement towards and from the latter, an actuating lever mounted for swinging movement relative to said base, a pressure wedge pivoted upon said lever and engaging and movable upon adjacent edges of said base and pressure arm for causing thereby swinging movement of the latter relative to said base, said pressure wedge comprising a roller eccentrically pivoted upon said lever enabling said roller to remain in engagement with the adjacent edges of said base and said pressure arm throughout the swinging movement of said actuating lever.

2. The combination of claim 1, wherein said adjacent edges and said pressure roller lie in the same plane.

3. The combination of claim 1, including cam surfaces on said adjacent edges.

4. The combination of claim 1, wherein the pivot of said pressure arm is located to one side of said base.

5. The combination of claim 1, including a ratchet assembly connected to the pivotal connection of said actuating lever to said base.

6. The combination of claim 1, including a plate secured to said base and underlying and supporting said pressure roller and retaining the latter in the plane of adjacent edges.

7. The combination of claim 1, wherein said actuating lever has sockets at each end thereof, a handle selectively inserted in either of said sockets.

8. The combination of claim 1 including knurled surfaces on the adjacent surfaces of said base and said pressure arm, said pressure roller engaging each of said knurled surfaces.

9. The combination of claim 1 wherein said roller has its periphery of relatively softer material than that of said base and pressure arm.

10. A floor tightening clamp comprising a flat metal strap comprising a base, means detachably securing said base to a floor structure for compressing lumber in side-by-side abutting engagement thereon, a pressure arm pivotally connected to said base for swinging movement towards and away from the latter, an actuating lever mounted for swinging movement relative to said base, wedge means pivoted upon said lever and engaging and movable upon adjacent edges of said base and pressure arm for causing thereby swinging movement of the latter relative to said base.

References Cited in the file of this patent
UNITED STATES PATENTS

| | | |
|---|---|---|
| 2,570,941 | Grigsby | Oct. 9, 1951 |
| 2,866,623 | Holmboe | Dec. 30, 1958 |